US008001943B2

(12) United States Patent
Kaneda et al.

(10) Patent No.: US 8,001,943 B2
(45) Date of Patent: Aug. 23, 2011

(54) STARTER FOR INTERNAL COMBUSTION ENGINE

(75) Inventors: Naohito Kaneda, Chiyoda-ku (JP); Hayato Yamauchi, Chiyoda-ku (JP); Keiichi Kusumoto, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/937,120

(22) Filed: Nov. 8, 2007

(65) Prior Publication Data

US 2009/0020093 A1 Jan. 22, 2009

(30) Foreign Application Priority Data

Jul. 18, 2007 (JP) ................................ 2007-186869

(51) Int. Cl.

| | |
|---|---|
| ***F02N 11/00*** | (2006.01) |
| ***F02N 15/02*** | (2006.01) |
| ***F02B 67/00*** | (2006.01) |
| ***F02F 7/00*** | (2006.01) |
| ***F16M 1/00*** | (2006.01) |

(52) U.S. Cl. .............................. 123/179.25; 123/195 A

(58) Field of Classification Search ............. 123/179.25, 123/179.26, 179.1, 195 A; 290/38 R
See application file for complete search history.

(56) References Cited

U.S. PATENT DOCUMENTS

| | | | | |
|---|---|---|---|---|
| 1,598,827 | A * | 9/1926 | Kroeger | 290/38 R |
| 1,617,651 | A * | 2/1927 | Rugroden | 123/406.76 |
| 1,634,751 | A * | 7/1927 | Kroeger | 290/38 R |
| 5,052,234 | A * | 10/1991 | Sugiyama | 74/6 |
| 5,720,247 | A * | 2/1998 | Suzuki et al. | 123/179.25 |
| 6,150,735 | A * | 11/2000 | Hisamoto | 307/10.6 |
| 2001/0054407 | A1* | 12/2001 | Ooizumi et al. | 123/179.3 |
| 2002/0066430 | A1* | 6/2002 | Kajino et al. | 123/179.25 |
| 2007/0215089 | A1* | 9/2007 | Grand et al. | 123/179.25 |

FOREIGN PATENT DOCUMENTS

| | | |
|---|---|---|
| JP | 50-106531 | 2/1949 |
| JP | 2000-87831 A | 3/2000 |
| JP | 3290353 B2 | 3/2002 |

* cited by examiner

*Primary Examiner* — Erick Solis
*Assistant Examiner* — Sizo B Vilakazi
(74) *Attorney, Agent, or Firm* — Sughrue Mion, PLLC

(57) ABSTRACT

A starter for an internal combustion engine has no radial protrusion of an auxiliary switch in a shape projected along an axial direction thereof, thus improving the degree of freedom in mounting the starter on the engine. An axially extending electromagnetic switch is mounted on a motor for turning it on and off. An auxiliary switch extends in an axial direction of the motor and is mounted thereon for operating the electromagnetic switch by means of an operation of a key switch. A pinion gear can be placed into or out of engagement with a ring gear of the engine so as to be driven by the motor. The motor has a bracket with a radially extending flange, through which the starter is mounted on the engine. The auxiliary switch is arranged at an inner side of a common tangent line between outer peripheries of the electromagnetic switch and the flange.

23 Claims, 7 Drawing Sheets

STARTER FOR INTERNAL COMBUSTION ENGINE

BACKGROUND OF THE INVENTION

1. Field of the Invention

The present invention relates to a starter provided with an auxiliary switch for turning on and off a current to operate an electromagnetic switch.

2. Description of the Related Art

In the past, in a starter for an internal combustion engine for use with a large-sized truck for example, an electromagnetic switch for driving a motor is operated by turning on a key switch, though through an auxiliary switch, because of a large current flowing through the motor.

In this case, the auxiliary switch is mounted on the motor while protruding in a diametrical or radial direction in a shape projected along an axial direction of the starter (see, for example, a first patent document: Japanese patent No. 3,290,353).

In the known starter for an internal combustion engine, the auxiliary switch is mounted on the motor while protruding in the radial direction, thus posing the following problem. That is, the degree of freedom in mounting the starter to the internal combustion engine is very low, so there is a great restriction on a mounting location at which the starter is mounted on the internal combustion engine.

SUMMARY OF THE INVENTION

Accordingly, the present invention is intended to obviate the problem as referred to above, and has for its object to obtain a starter for an internal combustion engine in which the degree of freedom in mounting of the starter on the internal combustion engine can be improved by eliminating the radial protrusion of an auxiliary switch in a shape projected along an axial direction thereof.

Bearing the above object in mind, a starter for an internal combustion engine according to the present invention includes: a motor that has a bracket with a flange formed so as to extend in a radial direction of the motor, with the starter being mounted on the internal combustion engine through the flange; an electromagnetic switch that extends in an axial direction of the motor and is mounted on the motor for turning on and off the supply of a current to the motor; an auxiliary switch that extends in the axial direction of the motor and is mounted on the motor for operating the electromagnetic switch by means of an operation of a key switch; and a pinion gear that can be placed into or out of engagement with a ring gear of the internal combustion engine so as to be driven to rotate by means of the motor. The auxiliary switch is arranged at an inner side of a common tangent line between an outer periphery of the electromagnetic switch and an outer periphery of the flange.

The present invention has an advantageous effect that the auxiliary switch has no diametrical or radial protrusion in a shape projected along an axial direction thereof, thus making it possible to improve the degree of freedom in mounting the starter on the internal combustion engine.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Figure 1:
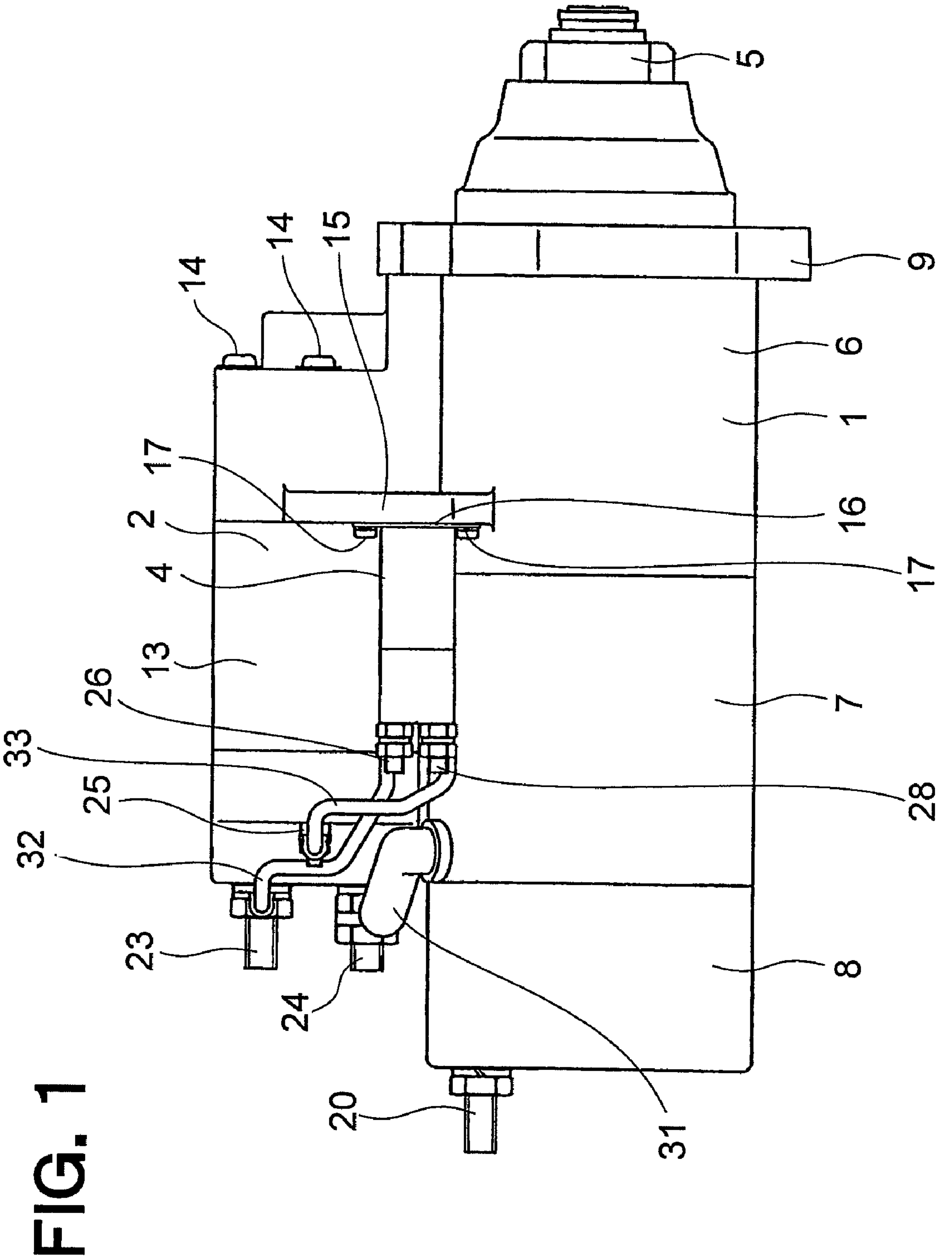
FIG. 1 is a front elevational view showing a starter for an internal combustion engine according to a first embodiment of the present invention.

Now, preferred embodiments of the present invention will be described in detail while referring to the accompanying drawings, in which the same or corresponding members or parts are identified by the same reference numerals and characters.

Embodiment 1

Figure 2:
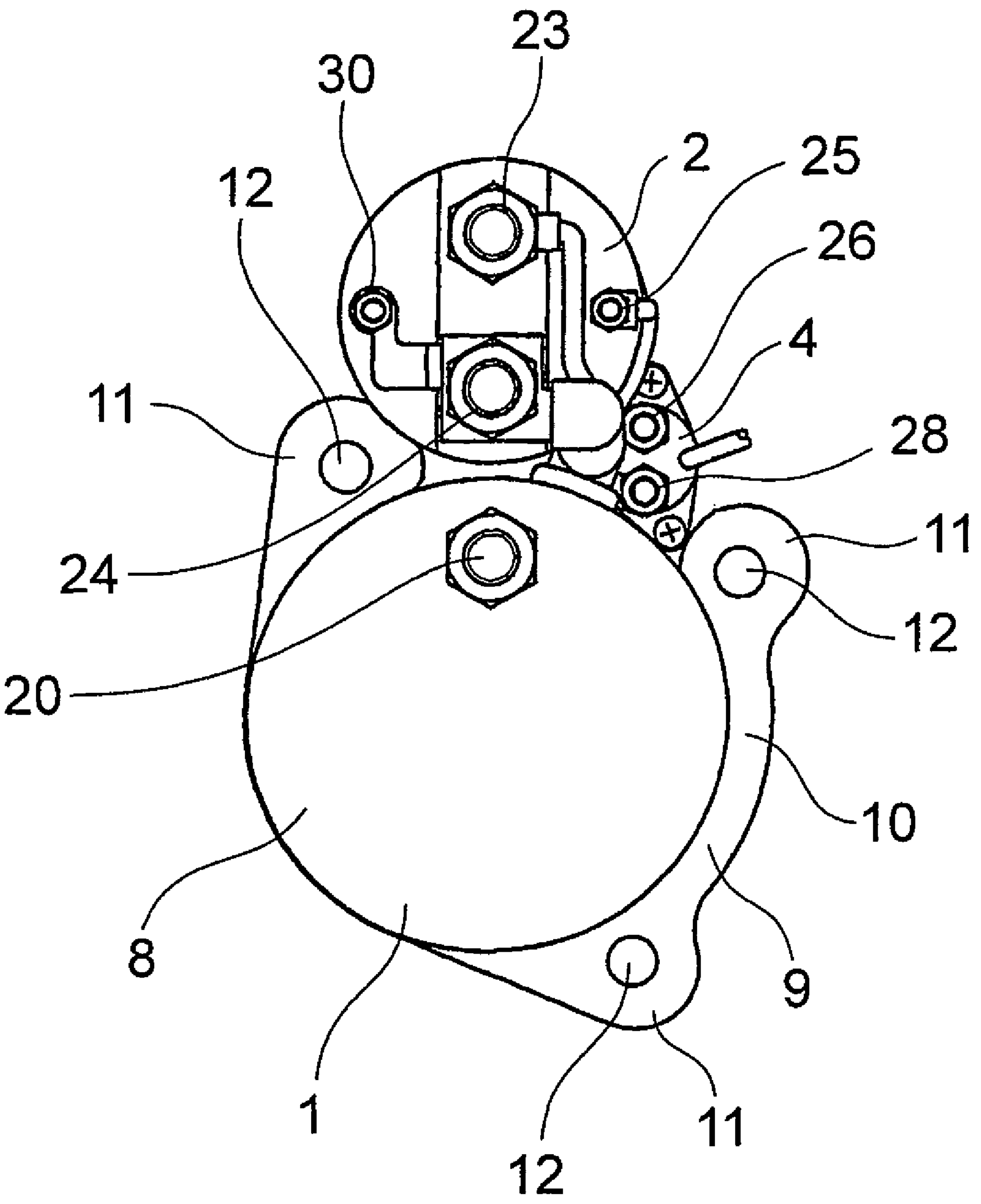
FIG. 2 is a left side view of the starter in FIG. 1.
Figure 3:
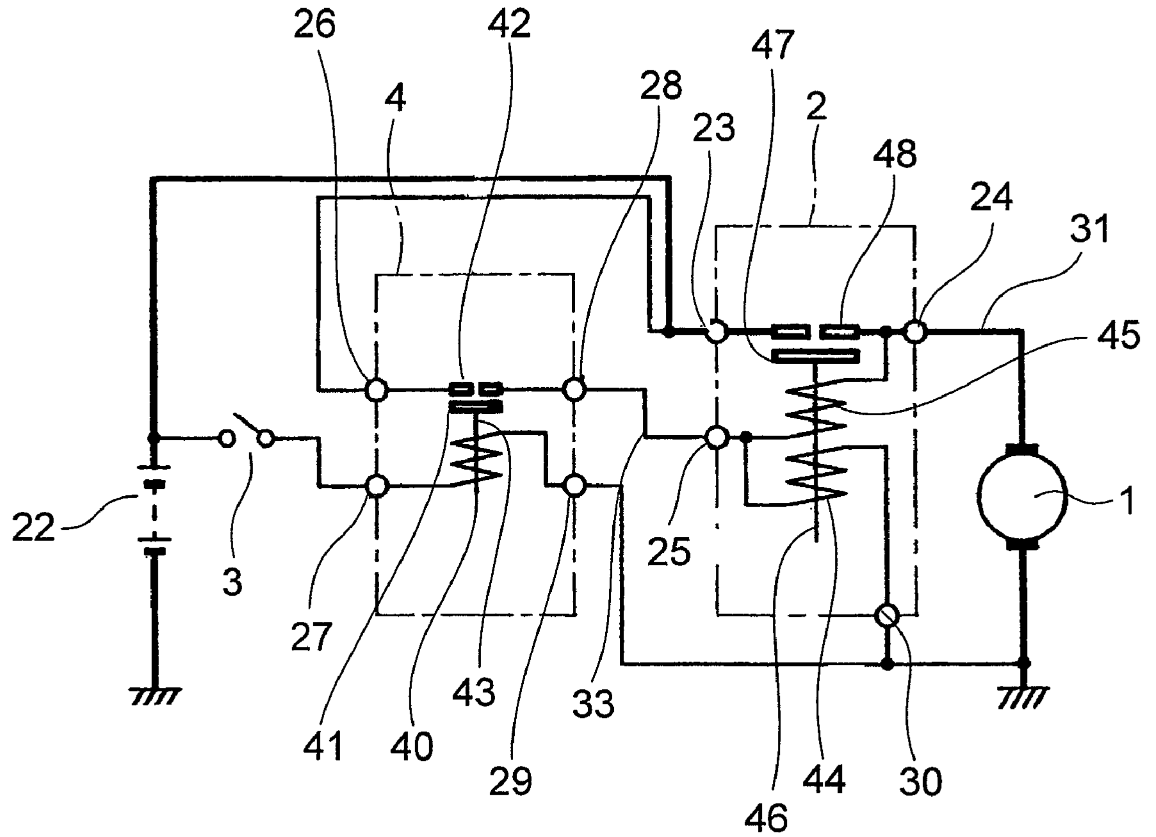
FIG. 3 is an electric circuit diagram of the starter in FIG. 1.

Referring to the drawings and first to FIG. 1, there is shown, in a front elevational view, a starter for an internal combustion engine (hereinafter abbreviated as a starter) according to a first embodiment of the present invention. FIG. 2 is a left side view of the starter in FIG. 1, and FIG. 3 is an electric circuit diagram of the starter in FIG. 1.

This starter includes a motor 1, an electromagnetic switch 2 that extends in an axial direction of the motor 1 and is mounted thereon for turning on and off the supply of current to the motor 1, an auxiliary switch 4 that extends in the axial direction of the motor 1, is mounted thereon and is electrically connected to the electromagnetic switch 2 so that it is operated by turning on a key switch 3, a clutch (not shown) that is mounted on a rotation shaft of the motor 1 so as to be movable in the axial direction thereof, a pinion gear 5 that is connected with the clutch for rotation therewith, and a lever (not shown) that has its opposite ends arranged between an end of a rod 46 of the electromagnetic switch 2 and the clutch for sliding motion relative thereto.

In the motor 1, individual parts of a stator 7 and a rotor (not shown) of the motor 1 as well as the clutch are received in the interior of a lower portion of a front bracket 6. A part of the rod 46 of the electromagnetic switch 2, etc., is received in an upper portion of the front bracket 6. In addition, a lever, being rotatable about its midpoint in accordance with movement of the rod 46 is received in the front bracket 6.

Also, individual parts of the stator 7 and the rotor are received in the interior of a rear bracket 8 of a bottomed cylindrical shape.

The front bracket 6 has a flange 9 formed at a side thereof near the pinion gear 5. The flange 9 includes a flange main body 10 of a circular shape, and tab portions 11 that protrude from the flange main body 10 in three diametrical or radial directions and have three bolt holes 12 formed therein, respectively. The starter is fixedly secured to the internal combustion engine by inserting bolts through the bolt holes 12 in the tab portions 11 of the flange 9 to be threaded to the internal combustion engine.

The casing 13 of the electromagnetic switch 2 is in abutment at its one end face with one side end face of the upper portion of the front bracket 6, and the casing 13 is fixedly secured to the front bracket 6 by means of screws 14 that are threaded to the front bracket 6 at circumferential intervals, i.e., the electromagnetic switch 2 is fixedly secured to the motor 1.

The front bracket 6 has a mounting seat 15 formed at a location adjacent to the electromagnetic switch 2 when seen along a direction perpendicular to the axis of the motor 1. A plate-shaped base 16 of the auxiliary switch 4 is threaded by two screws 17 to the mounting seat 15 that protrudes diametrally or radially in parallel to the flange 9, and the auxiliary switch 4 is fixedly attached to the motor 1 in parallel to the axial direction of the motor 1 and the electromagnetic switch 2, respectively.

Figure 4:
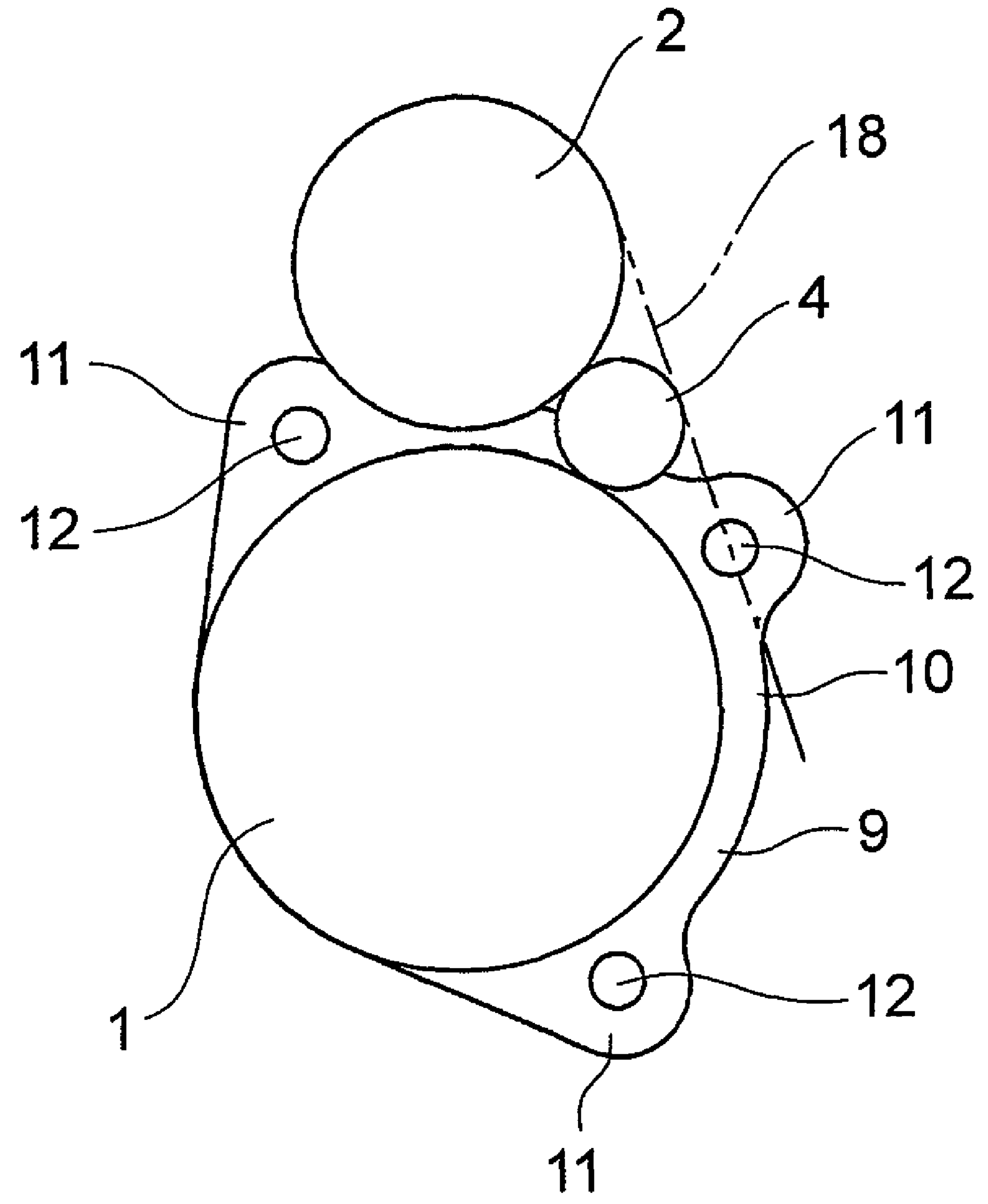
FIG. 4 is a view showing an arrangement relation among a motor, an electromagnetic switch and an auxiliary switch in FIG. 1.

FIG. 4 is a view showing an arrangement relation among the motor 1, the electromagnetic switch 2 and the auxiliary switch 4. The auxiliary switch 4 is disposed at an inner side of a common tangent line 18 of an outer periphery of the electromagnetic switch 2 and an outer periphery of the flange main body 10.

The motor 1 is provided with a ground terminal 20 that protrudes in an axial direction from the rear bracket 8 and a switch terminal (not shown) that is electrically connected to the electromagnetic switch 2.

The electromagnetic switch 2 is provided with a battery terminal 23 that protrudes in the axial direction and is electrically connected to the battery 22, a motor terminal 24 that is electrically connected to the motor 1, a switch terminal 25 that is electrically connected to the auxiliary switch 4, and a ground terminal 30.

The auxiliary switch 4 is provided with a battery terminal 26 that protrudes in the axial direction and is electrically connected to the battery 22, a key terminal 27 that is electrically connected to the key switch 3, a switch terminal 28 that is electrically connected to the electromagnetic switch 2, and a ground terminal 29. The individual terminals 26, 27, 28, 29 of the auxiliary switch 4 are arranged at an end thereof opposite to the pinion gear 5.

Here, note that in FIG. 1, there are shown a motor lead 31 connecting between the motor terminal 24 and the motor 1, a battery lead 32 connecting between the battery terminal 23 of the electromagnetic switch 2 and the battery terminal 26 of the auxiliary switch 4, and a switch lead 33 connecting between the switch terminal 25 of the electromagnetic switch 2 and the switch terminal 28 of the auxiliary switch.

Next, the operation of the starter as constructed above will be described below.

When the key switch 3 is turned on, a current from the battery 22 flows to ground through the key terminal 27, a coil 40 and the ground terminal 29 of the auxiliary switch 4. As a result, the coil 40 is excited, and a moving contact 41 of the auxiliary switch 4 is placed in abutment with a fixed contact 42 thereof in accordance with the movement of a plunger 43.

In accordance with the moving contact 41 being placed into abutment with the fixed contact 42, the current from the battery 22 flows to the switch terminal 25 of the electromagnetic switch 2 through the battery terminal 26 and the switch terminal 28 of the auxiliary switch 4 and the switch lead 33. At the switch terminal 25, the current flows to ground through a first coil 44 and the ground terminal 30 of the electromagnetic switch 2, and at the same time flows to the motor 1 through a second coil 45 and the motor terminal 24.

At this time, the rod 46 of the electromagnetic switch 2 is driven to move by excitation of the first coil 44 and the second coil 45, so that the lever is caused to rotate in accordance with the movement of the rod 46, whereby the pinion gear 5 is pushed out through the lever and is placed into meshing engagement with a ring gear (not shown) of the internal combustion engine. The meshing engagement of the pinion gear 5 with the ring gear is performed before a moving contact 47 of the electromagnetic switch 2 is placed into abutment with a fixed contact 48, so the current flowing from the battery 22 to the motor 1 is a minute current passing through the second coil 45 and the motor terminal 24, and the pinion gear 5, being provided with a minute rotational force, is placed into meshing engagement with the ring gear with a small impulsive force.

After the pinion gear 5 is placed into meshing engagement with the ring gear, the moving contact 47 of the electromagnetic switch 2 is placed into abutment with the fixed contact 48, after which the rated voltage of the battery 22 is impressed directly to the motor 1, whereby current flows from the battery 22 to the motor 1 through the battery terminal 23, the motor terminal 24 and the motor lead 31, whereby the motor 1 is driven to rotate at a rated speed, thereby starting up the internal combustion engine.

According to the starter of the above-mentioned construction, the auxiliary switch 4 is disposed at the inner side of the common tangent line 18 between the outer periphery of the electromagnetic switch 2 and the outer periphery of the flange main body 10, so the auxiliary switch 4 never protrudes in a diametrical or radial direction in the projected shape when the entire starter is seen along the axial direction thereof.

Thus, there is no protrusion of the auxiliary switch 4 upon mounting of the starter on the internal combustion engine, and the degree of freedom in mounting the starter on the internal combustion engine can be accordingly improved, whereby it becomes unnecessary to change the shape and position of the mounting seat 15 of the front bracket 6 due to a change in the mounting position of the auxiliary switch 4, and the kind of the front bracket 6 required can be decreased as much as possible, thereby making it possible to reduce the production cost.

In addition, the individual terminals 26, 27, 28, 29 of the auxiliary switch 4 are arranged at a side opposite to the pinion gear 5 and at a side near the leads connected with these terminals 26, 27, 28, 29, so the connection work of the individual terminals with the individual leads is simple, and the length of each lead can be shortened.

Moreover, the mounting seat 15 of the auxiliary switch 4 is formed at a location of the front bracket 6 adjacent to the electromagnetic switch 2, so the length of each lead can be made further short.

Embodiment 2

Figure 5:
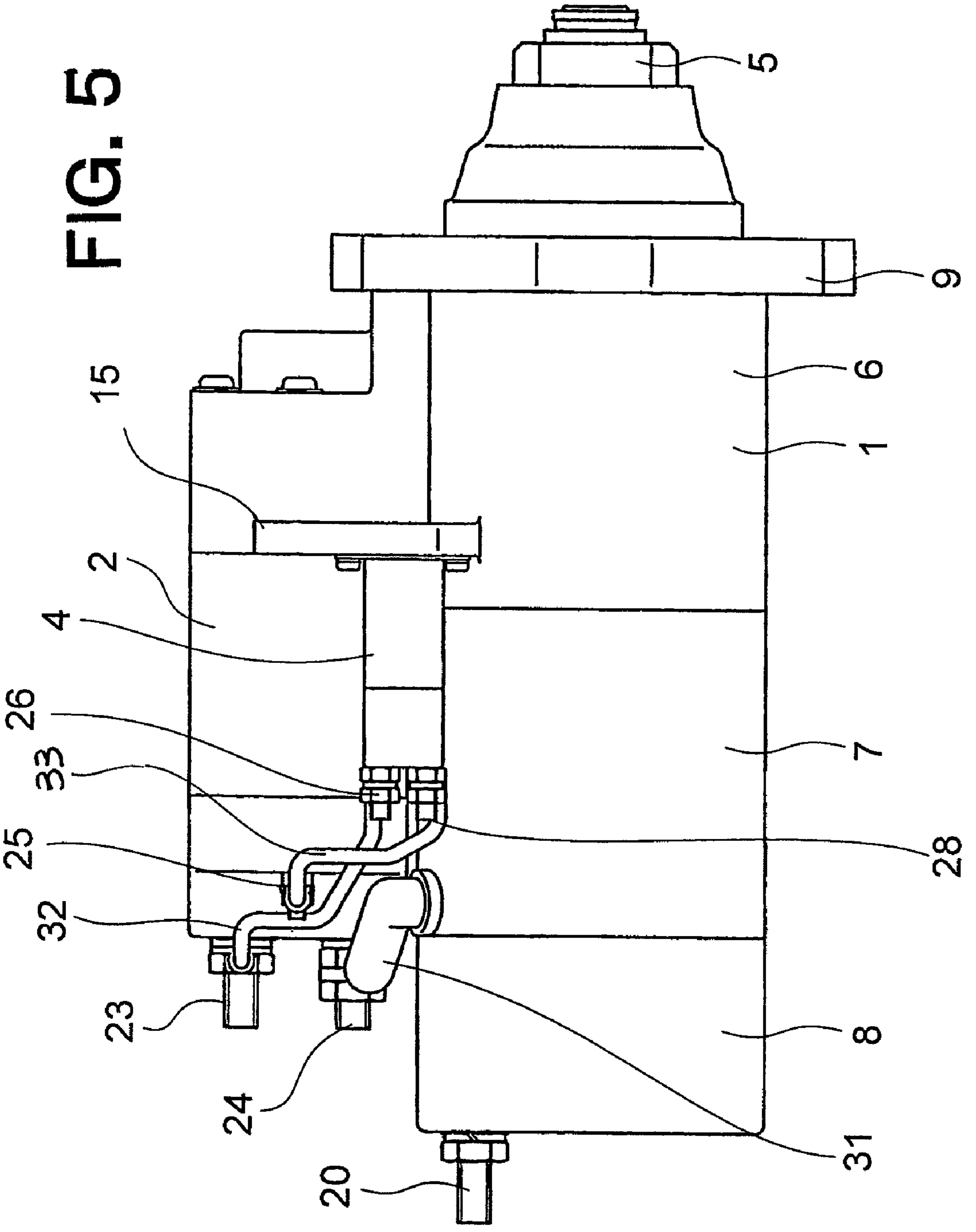
FIG. 5 is a front elevational view showing a starter for an internal combustion engine according to a second embodiment of the present invention.
Figure 6:
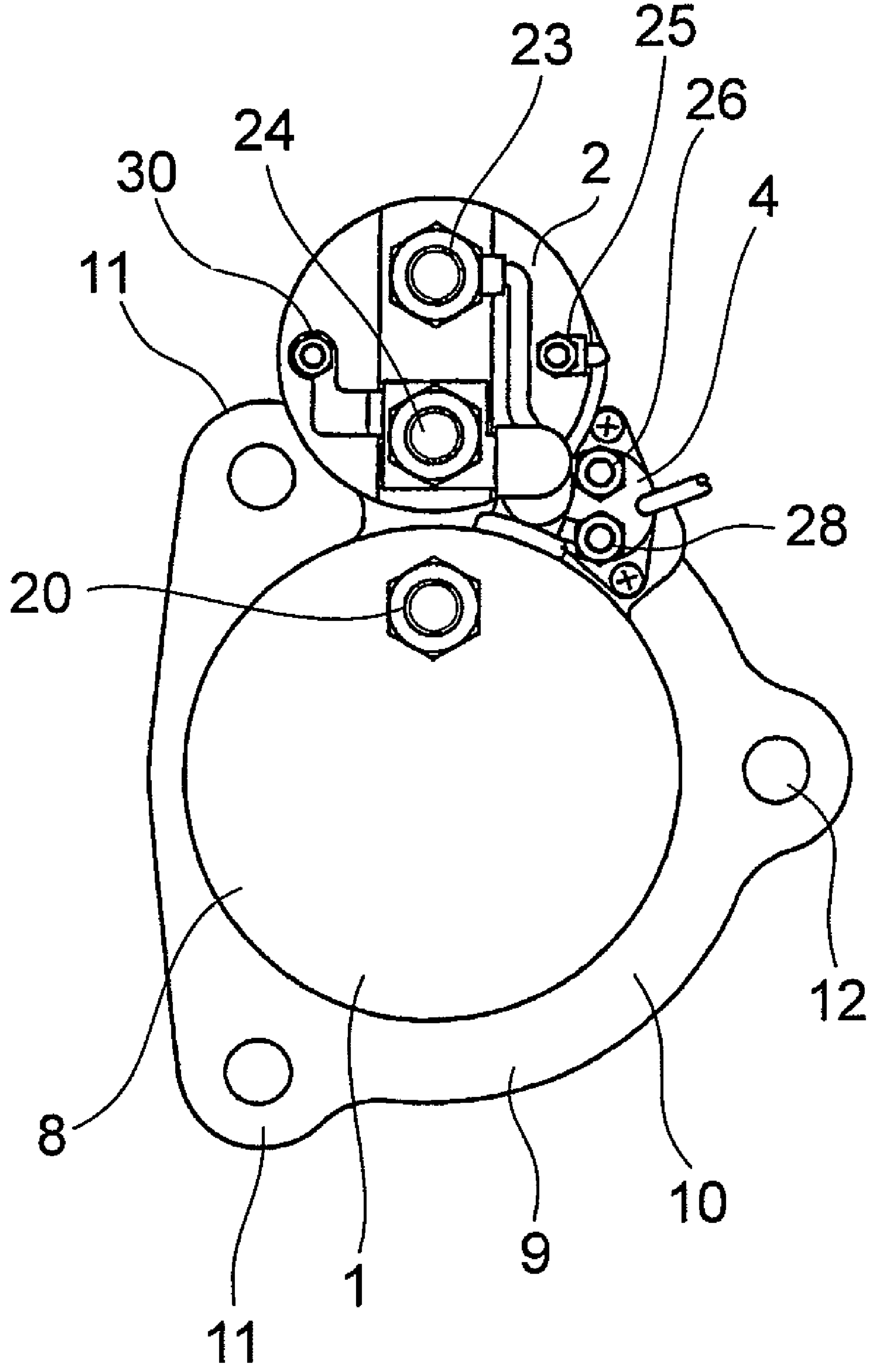
FIG. 6 is a left side view of the starter in FIG. 5.
Figure 7:
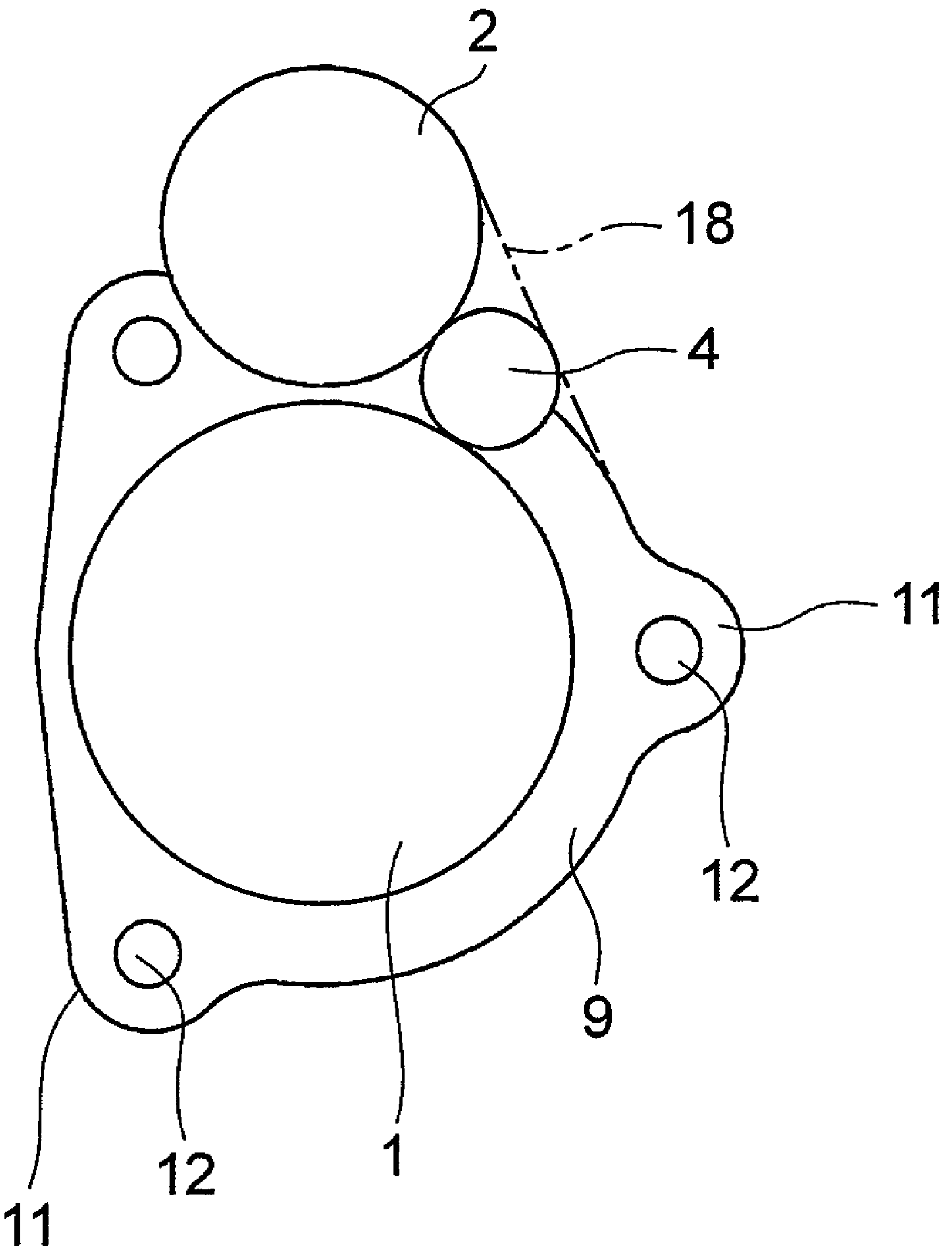
FIG. 7 is a view showing an arrangement relation among a motor, an electromagnetic switch and an auxiliary switch in FIG. 5.

FIG. 5 is a front elevational view that shows a starter for an internal combustion engine according to a second embodiment of the present invention. FIG. 6 is a left side view of the starter in FIG. 5, and FIG. 7 is a view that shows an arrangement relation among a motor 1, an electromagnetic switch 2 and an auxiliary switch 4 in FIG. 5.

In this second embodiment, too, the construction of the starter is similar to that of the first embodiment except for that an outer diameter of a flange 9 is larger over the entire circumference thereof than that of the motor 1, and the positions of three bolt holes 12 in the second embodiment are different from those in the first embodiment, and the auxiliary switch 4 is disposed at an inner side of a common tangent line 18 between an outer periphery of the electromagnetic switch 2 and an outer periphery of a flange main body 10.

Although in the above-mentioned first and second embodiments, the auxiliary switch 4 is disposed at the inner side of the common tangent line 18 between the outer periphery of the electromagnetic switch 2 and the outer periphery of the flange main body 10, it may be arranged at an inner side of a common tangent line between the outer periphery of the electromagnetic switch 2 and the outer periphery of one of the tab portions 11.

While the invention has been described in terms of preferred embodiments, those skilled in the art will recognize that the invention can be practiced with modifications within the spirit and scope of the appended claims.

What is claimed is:

1. A starter for an internal combustion engine including:

a motor that has a bracket with a flange formed so as to extend in a radial direction of said motor, with said starter being mounted on said internal combustion engine through said flange;

an electromagnetic switch that extends in an axial direction of said motor and is mounted on said motor for turning on and off the supply of a current to said motor;

an auxiliary switch that extends in said axial direction of said motor and is mounted on said motor for operating said electromagnetic switch by means of an operation of a key switch; and a pinion gear that can be placed into or out of engagement with a ring gear of said internal combustion engine so as to be driven to rotate by means of said motor;

wherein said auxiliary switch is arranged at an inner side of a common tangent line which extends from an outer peripheral surface of said electromagnetic switch to an outer peripheral surface of said flange, said auxiliary switch is encompassed within an area between said common tangent line, said outer peripheral surface of said electromagnetic switch and an outer peripheral surface of said motor, said auxiliary switch is entirely disposed within said area which extends in said axial direction of said motor, and wherein said auxiliary switch comprises a battery terminal and is electrically connected to the battery, a key terminal that is electrically connected to the key switch, a switch terminal that is electrically connected to the electromagnetic switch, and a ground terminal.

2. The starter for an internal combustion engine as set forth in claim 1, wherein said flange has a flange main body and a tab portion with a bolt hole formed therein, and said outer peripheral surface of said flange is an outer peripheral surface of said flange main body and does not include an outer peripheral surface of said tab portion having said bolt hole formed therein.

3. The starter for an internal combustion engine as set forth in claim 1, wherein said auxiliary switch has individual terminals disposed at a side opposite to said pinion gear.

4. The starter for an internal combustion engine as set forth in claim 1, wherein said auxiliary switch is mounted on a mounting seat that is formed on said bracket at a location adjacent to said electromagnetic switch when seen along a direction perpendicular to said axis of said motor.

5. The starter for an internal combustion engine as set forth in claim 1, wherein said common tangent line is tangential to both a point on said outer peripheral surface of said electromagnetic switch and a point on said outer peripheral surface of said flange.

6. The starter for an internal combustion engine as set forth in claim 5, wherein said auxiliary switch has an outer peripheral surface arranged along said common tangent line such that a point on said outer peripheral surface of said auxiliary switch is tangential to said common tangent line.

7. The starter for an internal combustion engine as set forth in claim 5, wherein said auxiliary switch is arranged between both said point on said peripheral surface of said electromagnetic switch and said point on said outer peripheral surface of said flange in a plane orthogonal to an axial axis of said motor.

8. The starter for an internal combustion engine as set forth in claim 1, wherein said auxiliary switch is fixedly attached directly to said motor in parallel to said axial direction thereof and directly to said electromagnetic switch.

9. The starter for an internal combustion engine as set forth in claim 2, wherein said common tangent line is tangential to both a point on said outer peripheral surface of said electromagnetic switch and a point on said outer peripheral surface of said flange, said point on said outer peripheral surface of said flange is a point on said flange main body.

10. The starter for an internal combustion engine as set forth in claim 9, wherein said auxiliary switch has an outer peripheral surface arranged along said common tangent line.

11. The starter for an internal combustion engine as set forth in claim 10, wherein said auxiliary switch is arranged between both said point on said peripheral surface of said electromagnetic switch and said point on said outer peripheral surface of said flange main body in a plane orthogonal to an axial axis of said motor.

12. The starter for an internal combustion engine as set forth in claim 1, wherein said flange has a flange main body and a tab portion with a bolt hole formed therein, and said outer peripheral surface of said flange is an outer peripheral surface of said tab portion having said bolt hole formed therein.

13. The starter for an internal combustion engine as set forth in claim 12, wherein said common tangent line is tangential to both a point on said outer peripheral surface of said electromagnetic switch and a point on said outer peripheral surface of said flange, said point on said outer peripheral surface of said flange is a point on an outer peripheral surface of said tab portion.

14. The starter for an internal combustion engine as set forth in claim 13, wherein said auxiliary switch is arranged between both said point on said peripheral surface of said electromagnetic switch and said point on said outer peripheral surface of said tab portion of said flange in a plane orthogonal to an axial axis of said motor.

15. The starter for an internal combustion engine as set forth in claim 14, wherein said tab portion of said flange extends further in said radial direction than said main body of said flange.

16. The starter for an internal combustion engine as set forth in claim 1, wherein an outer peripheral surface of said auxiliary switch directly abuts both said outer peripheral surface of said electromagnetic switch and said outer peripheral surface of said motor.

17. A starter for an internal combustion engine including:

a motor that has a bracket with a flange formed so as to extend in a radial direction of said motor, with said starter being mounted on said internal combustion engine through said flange;

an electromagnetic switch that extends in an axial direction of said motor and is mounted on said motor for turning on and off the supply of a current to said motor;

an auxiliary switch that extends in said axial direction of said motor and is mounted on said motor for operating said electromagnetic switch by means of an operation of a key switch; and a pinion gear that can be placed into or out of engagement with a ring gear of said internal combustion engine so as to be driven to rotate by means of said motor;

wherein said auxiliary switch is arranged at an inner side of a common tangent line which extends from an outer peripheral surface of said electromagnetic switch to an outer peripheral surface of said flange, said auxiliary switch is encompassed within an area between said common tangent line, said outer peripheral surface of said electromagnetic switch and an outer peripheral surface of said motor, said flange has a flange main body and a tab portion with a bolt hole formed therein, and said outer peripheral surface of said flange is an outer peripheral surface of said flange main body and does not include an outer peripheral surface of said tab portion having said bolt hole formed therein, and wherein said auxiliary switch comprises a battery terminal and is electrically connected to the battery, a key terminal that is electrically connected to the key switch, a switch terminal that is electrically connected to the electromagnetic switch, and a ground terminal.

18. The starter for an internal combustion engine as set forth in claim 17, wherein said common tangent line is tangential to both a point on said outer peripheral surface of said electromagnetic switch and a point on said outer peripheral surface of said flange, said point on said outer peripheral surface of said flange is a point on said flange main body.

19. The starter for an internal combustion engine as set forth in claim 18, wherein said auxiliary switch has an outer peripheral surface arranged along said common tangent line.

20. The starter for an internal combustion engine as set forth in claim 18, wherein said auxiliary switch has an outer peripheral surface arranged along said common tangent line such that a point on said outer peripheral surface of said auxiliary switch is tangential to said common tangent line.

21. The starter for an internal combustion engine as set forth in claim 17, wherein an outer peripheral surface of said auxiliary switch directly abuts both said outer peripheral surface of said electromagnetic switch and said outer peripheral surface of said motor.

22. The starter for an internal combustion engine as set forth in claim 1, wherein said auxiliary switch comprises a first axial end and a second axial end disposed closer to said pinion gear than said first axial end, wherein said battery terminal, said key terminal, said switch terminal and said ground terminal are disposed on the first axial end such that said battery terminal, said key terminal, said switch terminal and said ground terminal are do not extend beyond an axial plane of the auxiliary switch in a radial direction.

23. The starter for an internal combustion engine as set forth in claim 17, wherein said auxiliary switch comprises a first axial end and a second axial end disposed closer to said pinion gear than said first axial end, wherein said battery terminal, said key terminal, said switch terminal and said ground terminal are disposed on the first axial end such that said battery terminal, said key terminal, said switch terminal and said ground terminal are do not extend beyond an axial plane of the auxiliary switch in a radial direction.

* * * * *